United States Patent
Shuler et al.

(10) Patent No.: US 7,584,136 B2
(45) Date of Patent: Sep. 1, 2009

(54) SYSTEMS AND METHODS FOR INTERACTIVE BEEF CATTLE MARKETPLACE

(75) Inventors: Richard O. Shuler, Alpharetta, GA (US); Lynn Godbersen, Winterset, IA (US); James Norwood, Kansas City, MO (US); Joseph Young, Olathe, KS (US); William Fleck, Duluth, GA (US); David Lind, Overland, KS (US); Kevin DeHaan, Taylor, MO (US); Thomas Nicholson, Indianola, IA (US); Marcell J. Sarzen, Dunwoody, GA (US)

(73) Assignee: Agspan, Inc., Norcross, GA (US)

( * ) Notice: Subject to any disclaimer, the term of this patent is extended or adjusted under 35 U.S.C. 154(b) by 1994 days.

(21) Appl. No.: 09/909,587

(22) Filed: Jul. 20, 2001
(Under 37 CFR 1.47)

(65) Prior Publication Data
US 2002/0065765 A1 May 30, 2002

(51) Int. Cl.
*G06Q 40/00* (2006.01)
(52) U.S. Cl. .......................................... 705/37; 705/26
(58) Field of Classification Search .................... 705/37
See application file for complete search history.

(56) References Cited
U.S. PATENT DOCUMENTS
5,673,647 A * 10/1997 Pratt ....................... 119/51.02

6,311,178 B1 * 10/2001 Bi et al. ........................... 707/3
2001/0039527 A1 * 11/2001 Ordish et al. ................. 705/37

OTHER PUBLICATIONS

Jim Gransbery. "Bull breeders keep track of the consumer." The Billings Gazette. Billings, Mont: Oct. 17, 1995. Sec. A. p. 7. (3 pages total).*
Arlene Weintraub, "Selling Livestock at New On-Line Stockyards", Aug. 24, 1998, New York Times, p. 1-3.*

* cited by examiner

Primary Examiner—Andrew J. Fischer
Assistant Examiner—Chrystina Zelaskiewicz
(74) Attorney, Agent, or Firm—Alston & Bird LLP

(57) ABSTRACT

A system and method for dynamically marketing cattle is provided comprising a buyer interface, a producer interface, a network, and an cattle information server. The cattle information server receives information from the buyer interface defining a plurality of demand profiles at least one which contains information specifying a first pre-conditioning program. The cattle information server also receives information from the producer interface defining a supply profile that specifies a second pre-conditioning program and stores the demand profiles and supply profile in a database. The cattle information server searches the database to determine if one or more of the demand profiles match the supply profile based at least in part on a comparison of the first and second pre-conditioning programs and identifies at least one demand profile in response to a match between the supply profile and the demand profile.

10 Claims, 5 Drawing Sheets

SYSTEMS AND METHODS FOR INTERACTIVE BEEF CATTLE MARKETPLACE

FIELD OF THE INVENTION

The present invention relates to interactive networked marketplaces. More particularly, the present invention relates to an interactive marketplace that facilitates the development and marketing of beef cattle.

BACKGROUND OF THE INVENTION

One the biggest problems facing the cattle industry today is the lack of a systematic and integrated method of breeding and marketing cattle to suit the expressed needs of cattle buyers. Although the beef industry is U.S. agriculture's largest sector, it is one of the least efficient. In an attempt to correct this problem, there is a growing trend in the beef industry to apply concepts such as consolidation, vertical integration, production to specification and valued-based marketing to improve beef production efficiency, product quality, and consistency among particular brands and/or types of cattle.

Consumer demand for predictably safe, healthy and tasty beef product is the catalyst for this trend. In response to consumer demand, the beef cattle industry is attempting to shift to a branding concept that utilizes an integrated production system. Integrated branded beef systems typically consist of two or more business partners, each representing a single phase of production, i.e., breeding, production, feeding, slaughter, processing, or retail. Cattlemen and beef industry business leaders are forming such partnerships to develop branded beef products. The attempt to create an integrated branded beef system, however, is typically impeded by a number of factors present in the cattle industry. For example, due to the large number of independent cattle producers with stock of varied genetic backgrounds, there is significant variation in quality and other characteristics within the supply of feeder cattle available for finishing and harvesting. Thus, even cattle purchased from the same supplier may vary significantly in quality and characteristics.

Another significant challenge facing the cattle industry is its organization. Beef production systems typically consist of multiple owners and profit centers. Due to the number of participants in the production process, it is difficult to maintain any level of consistency and/or brand identity. Furthermore, cattle buyers and producers (suppliers) are typically limited in their purchasing and marketing options. Historically, producers have offered their cattle for sale only to a limited number of buyers either privately or through an auction. If the cattle are sold privately, the producer normally prices the cattle and the buyers either offer a counter-bid or accept the producer's offer. However, buyers are limited because it is often difficult to participate in numerous private sales. In an auction, the producer is typically at the mercy of a limited number of buyers that bid on the cattle offered. If a limited number of buyers attend the auction, then the producers may be forced to accept the auction price, even if they could have obtained a higher price elsewhere.

Another significant challenge caused by the existing industry structure is that information feedback is very limited. Producers rarely learn how their animals performed in the feeding and harvesting phases. Without that feedback, producers do not have the information they need to make changes in their genetics, and implement management systems to better meet the needs of the integrated branded beef programs.

Therefore there is a need for an integrated system that allows cattle producers and buyers to interact in a manner that facilitates consistent and reliable cattle production.

SUMMARY OF THE INVENTION

The present invention provides an integrated system that allows cattle producers and buyers to interact in a manner that facilitates consistent and reliable cattle production. As described herein, the present invention comprises methods and systems for implementing a beef cattle marketplace that enables cattle buyers and cattle producers to coordinate their efforts to facilitate more efficient and reliable production of cattle. The present invention also implements quality control features that enable cattle producers to certify that their cattle have been raised according to predefined criteria thus enabling cattle buyers to specify certain criteria for the cattle they wish to purchase.

According to one embodiment of the present invention, a system and method for dynamically marketing cattle is provided comprising a buyer interface, a producer interface, a network, and an cattle information server, wherein the cattle information server is communicatively connected to the buyer interface and the producer interface through the network. According to this embodiment, the cattle information server receives information from the buyer interface defining a plurality of demand profiles, wherein at least one of the demand profiles contains information specifying a first pre-conditioning program. The cattle information server also receives information from the producer interface defining a supply profile, wherein the supply profile specifies a second pre-conditioning program and stores the demand profiles and supply profile in a database. The cattle information server searches the database to determine if one or more of the demand profiles match the supply profile based at least in part on a comparison of the first and second pre-conditioning programs and identifies to one of the buyer interface and producer interface at least one demand profile in response to a match between the supply profile and the demand profile. Advantageously, the present invention enables cattle producers to locate cattle buyers that are seeking cattle with specific characteristics while also enabling cattle buyers to specify their needs very early in the production process. This may enable the cattle producers to make changes to their production routines in order to satisfy an identified need for cattle with particular characteristics.

According to another embodiment of the present invention, a method for tracking cattle production in a beef cattle marketplace is provided comprising a cattle information server and at least one interface communicatively connected to a network. The cattle information server receives information defining a supply profile from the interface and the supply profile specifies a pre-conditioning program of an identified group of cattle. The cattle information server also preferably receives information verifying the pre-conditioning program and stores the supply profile of the identified group of cattle in a database associated with the cattle information server. The cattle information server also receives information defining carcass characteristics of the identified group of cattle at the time of harvest from the interface, stores the carcass characteristics of the identified group of cattle in a database associated with the cattle information server, and correlates the carcass characteristics of the identified group of cattle with the supply profile. Advantageously, present invention enables participants in the cattle industry to track cattle growth and characteristics from birth to harvest, thereby allowing them to identify trends regarding how pre-conditioning programs, geographic location, and other factors affect particular cattle at the time of harvest.

Other features and advantages of the present invention will become apparent to one skilled in the art upon examination of the following drawings and detailed description. It is intended that all such features and advantages be included herein within the scope of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
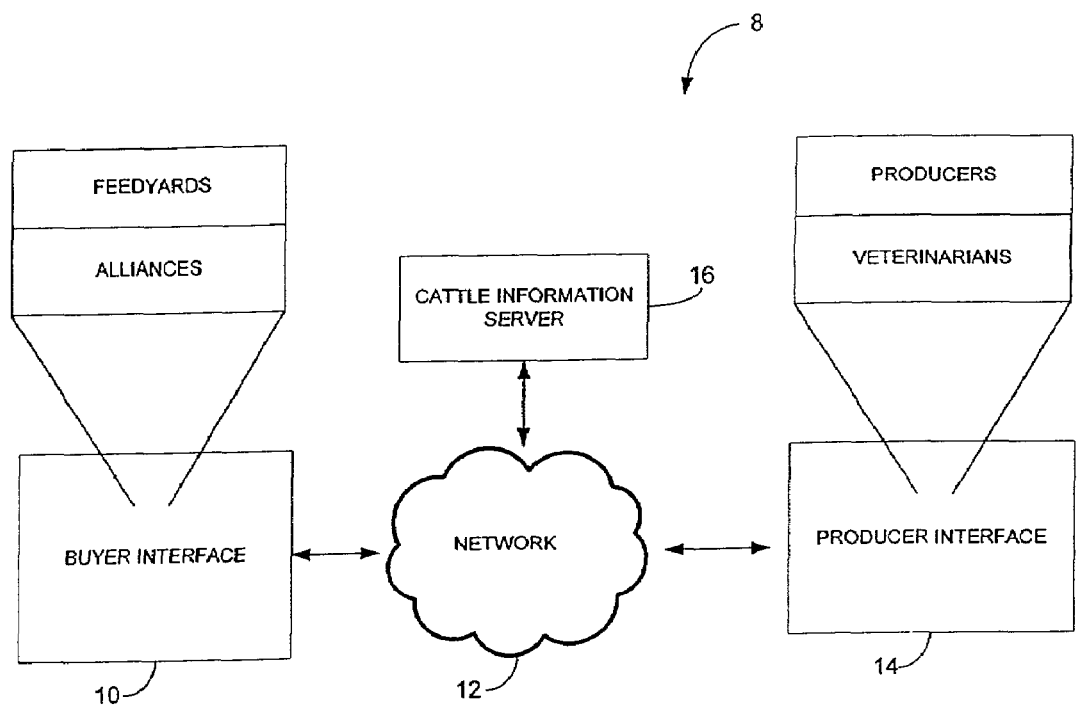
FIG. 1 is a high-level representation of one possible embodiment of the present invention.

In general terms, the present invention is directed towards implementing a beef cattle marketplace that provides services facilitating the development, tracking, and marketing of beef cattle by enabling both cattle producers and cattle buyers to access information regarding potential cattle transactions and archived information regarding past transactions. The beef cattle marketplace also enables producers to certify their production procedures and track cattle performance over time and produce cattle with more consistent and predictable characteristics. FIG. 1 shows a high-level representation of a beef cattle marketplace according to an embodiment of the present invention. As shown generally in FIG. 1, the present invention comprises a buyer interface 10, a producer interface 14, and a cattle information server 16 that are communicatively connected via a secure network 12. The network 12 may be any network with sufficient connectivity to enable communication between the cattle buyer interface 10, the cattle producer interface 14, and the cattle information server 16 such as the Internet, a local area network, or a wide area network.

The cattle information server 16 is preferably a computer with sufficient resources to support access by a plurality of cattle producers and buyers. According to one possible embodiment of the present invention, the server is a computer comprising a 32-bit×86 processor, a hard disk with 128 megabytes (MB) or more of free space, a network interface card, a CD-ROM drive, 64 MB or more of random access memory (RAM) that may be expanded to accommodate access by additional cattle producers and buyers, a mouse, a keyboard, and a monitor. It will be appreciated, however, that this system is provided merely for illustrative purposes. The server may also be a unix-based system such as the Sparcstation provided by Sun Microsystems or any other computer system with sufficient resources to provide the functionality as described herein.

Figure 2:
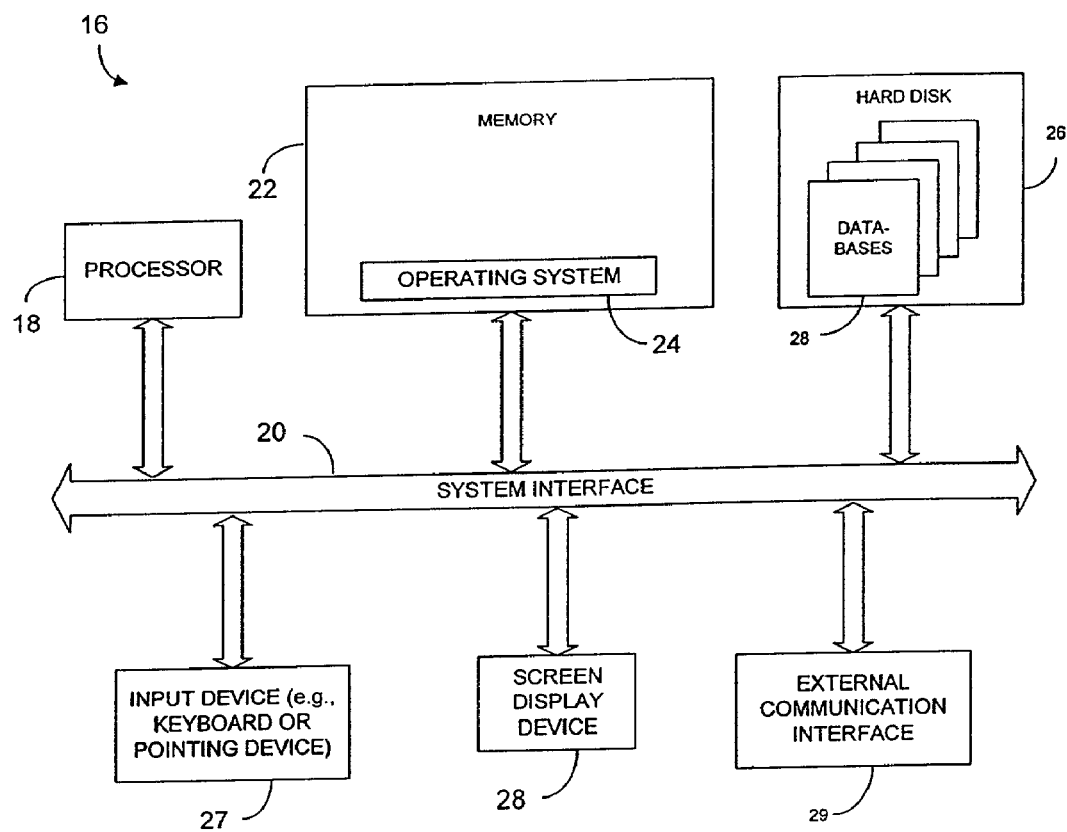
FIG. 2 is a schematic illustration of a server according to one possible embodiment of the invention.

Turning now to FIG. 2, there is a shown a schematic diagram representing the functional components of a possible cattle information server 16 according to the present invention. The server 16 may comprise a processor 18, a memory 22, and a hard disk 26 communicatively connected to a system interface 20. The system interface 20 is also preferably connected to an input device 27, a display device 28 and an external communication interface 29. The memory 22 preferably comprises an operating system 24 and software to facilitate server operation and communication with the cattle buyer interface 10, network 12, and cattle supplier interface 14. The memory may also comprise program logic implementing one of more of the features described below. The hard disk 26 preferably contains memory sufficient to store information concerning the cattle producers, buyers and veterinarians as well as information regarding cattle. In addition, the hard disk 26 may contain one or more searchable databases that store profile information for the cattle producers, cattle buyers, and cattle including pre-conditioning and certification programs, cattle characteristics, past transaction histories, etc. Alternatively, one or more databases may be located remote from the cattle information server 16 in a separate server or storage device in communication with the cattle information server 16. The system interface 20 may be a computer bus that facilitates the exchange of information between the components of the server. The input device 27 may be a keyboard, mouse, etc. that allows information to be input into the server. The screen display device 28 enables information to be displayed to a user. The external communication interface 29 facilitates communication between the cattle information server 16 and the network 12. The particular configuration of the cattle information server 16 is not important so long as the server contains sufficient resources to implement the functionality of the beef cattle marketplace as described herein.

The cattle buyer interface 10 and the producer interface 14 may be any device capable of communicating with the network 12 to exchange information with the cattle information server 16 such as a computer, a PDA, a telephone, or any other messaging or communication device. In a preferred embodiment, the buyer interface 10 and the producer interface 14 comprises a computer communicatively connected to the Internet (which may be part of the network 12). Preferably, the buyer interface 10 and the producer interface 14 also comprise a graphical user interface, such as an Internet web browser, that is capable of receiving and displaying Internet web pages received from the cattle information server 16. It will be appreciated, however, that the buyer interface 10 and the producer interface 14 may comprise any device or interface that enables buyers and producers to exchange information with the cattle information server 16. For example, access to the cattle information server 16 may be provided via telephone. In this embodiment, a representative of the beef cattle marketplace may communicate with a buyer, producer, or veterinarian and manually input information into the cattle information server 16 using a dedicated terminal or personal computer connected to the cattle information server 16 via a local or wide area network.

The following discussion describes the functionality of the beef cattle marketplace with reference to the Internet embodiment described above. It will be appreciated, however, that any of numerous cattle buyer and supplier interfaces, including but not limited to those interfaces described herein, may be employed without altering the novel aspects of the present invention. It will also be appreciated that the system of the present invention may be embodied in numerous different network configurations. For example, the buyer interface 10 and the producer interface 14 may comprise thin-client terminals or dumb terminals as is well known in the art.

The buyer may gain access to the beef cattle marketplace by first logging into the cattle information server 16 by inputting information into the cattle buyer interface 10. In a preferred embodiment, the buyer interface 14 may comprise a computer communicatively connected to the Internet. However, numerous other devices, such as phones, PDA's, facsimile machines, or local or wide area networks (LANs and WANs respectively), may also be used to provide access to the beef cattle marketplace server. The following discussion assumes that the producer accesses the beef cattle marketplace via an Internet-based interface. It will be appreciated, however, that similar access devices may be used without altering the novel aspects of the present invention.

Preferably, the buyer uses the cattle buyer interface 10 to connect to an Internet web site that is hosted by the cattle information server 16. In this embodiment, the cattle buyer is presented with a login screen that enables the buyer to either login to the system using previously assigned login information or to create a new cattle buyer profile and receive unique login information corresponding to the respective cattle buyer profile.

In a preferred embodiment, the cattle buyer profile is compiled by presenting the cattle buyer, via the cattle buyer interface 10, with a fillable template containing a plurality of fields that may filled in with information concerning, for example, the cattle buyer's identity, past transaction history, purchasing preferences or any other information that simplifies the process by which the cattle buyer uses the system. After filling in the form, the cattle buyer may submit the form to the cattle information server 16 over the network 12. Once a cattle buyer profile is created, the cattle information server 16 may store the cattle buyer profile in a secure database located in the hard-disk 26 or some other database server communicatively connected to the cattle information server 16. Preferably, the cattle information server 16 issues a secure username and password to the cattle buyer to be used for future access. It will be appreciated, however, that the buyers may also be given the option of creating their own username and/or password.

After the cattle buyer profile has been created, the cattle buyer is provided with access to the beef cattle marketplace by way of a buyer account interface. The buyer account interface is preferably an Internet web page generated by the cattle information server 16 and displayed to the buyer via the buyer interface 10. The buyer account interface displays various information relevant to the buyer such as past transaction history, pending demand profiles (as described below), or other information relevant to the buyer industry such as industry news etc. In a preferred embodiment, the buyer account interface comprises information concerning real-time (or regularly updated) commodity futures prices for both grain and livestock. The buyer account interface also preferably includes information regarding the buyer's recent transactions. This information is preferably displayed in summary form wherein only certain aspects of the transaction are shown such as weight, delivery date, sex, and price. The cattle-buyer account interface may also provide links to each transaction that enable the buyer to view the full details of the transaction. This links are linked to database information stored within (or accessible by) the cattle information server 16.

Similarly, the buyer account interface also preferably comprises information regarding recent transactions that have taken place in the beef cattle marketplace. Advantageously, this information enables the cattle buyer to gain an understanding of the prevailing market conditions. This may be accomplished in a manner similar to that described above with respect to the display of the buyer's recent transactions. It should be noted, however, that the identity of the cattle buyer and producer involved in the transaction are preferably not displayed. Instead, the transaction summary may contain information regarding the geographic location of the buyer and seller or other information indicative of current or future market conditions.

The cattle buyer account information also preferably provides access to the services offered by the beef cattle marketplace. In a preferred embodiment, the buyer account interface will also provide access to a searchable database containing past transaction histories. This database may be used by both buyers and producers (i.e. sellers) to graphically display trends for each class and type of cattle. For example, the transaction database may enable the buyer to request the price history for the last two years for a particular cattle breed in a certain weight range. The buyer may also be given the added ability to specify only cattle that have undergone a specified pre-conditioning program or only cattle that have been shipped to or from a specified location (such as a state or geographic region). It will be appreciated by those of skill in the art, however, that the content of the cattle buyer account interface may be altered to facilitate faster and more efficient access to the beef cattle marketplace.

Cattle-Buyer Demand Profiles

According to one of the present invention, a buyer may create a demand profile detailing the buyer's purchasing needs and or preferences. Advantageously, because the demand profile is submitted to the beef cattle marketplace, the cattle buyer is able to post its purchasing preferences and access a much greater volume of cattle producers than is presently feasible using the methods presently known in the industry. One possible procedure for creating a demand profile will now be described with general reference to FIG. 3. As shown by block 50, the cattle buyer must first login to the cattle information server 16, preferably by using a unique username and password. If the cattle information server 16 determines that the login information is correct, the cattle buyer is provided access to their account interface as shown in block 55. As described above, the cattle buyer account interface is preferably an Internet web page containing at least one link to another interface (preferably another internet web page) that enables the cattle buyer to create a demand profile, as shown in block 60.

In a preferred embodiment, the cattle buyer is presented with a fillable web page generated by the cattle information server 16. The web page is preferably displayed via the buyer interface 10. The template preferably comprises a number of text fields in which cattle buyers may enter their purchasing preferences. In a preferred embodiment, the cattle buyer may enter information concerning the desired animal type or types, the animal's pre-conditioning program, the buyer's willingness to accept retained ownership cattle (i.e., cattle where ownership is retained by the producer during the feeding phase), and the buyer's preferences regarding animal carcass characteristics.

The animal type may comprise merely the type of cow such as ¼ blood Brahman or English/English Cross. However, as the cattle industry develops more specific characteristics such as specific gene types or genetic markers, the animal type may comprise this information as well. Advantageously, this enables the buyer to specify the particular types of cattle as well as specific traits within each cattle type. As cattle production is integrated and refined, the animal type can be used to specify cows with only certain characteristic features and gene types known to produce certain characteristics.

The information regarding the animal's pre-conditioning program may include any of numerous protocols or criteria that govern the breeding, feeding, management, and health of the cattle prior to slaughter. For example, the cattle buyer may specify that it only wishes to purchase cattle that have undergone the VAC45 pre-conditioning program under which cattle are weaned for at least 45 days before sale, have received all vaccinations, and, if the cattle are bulls, have been castrated. It will be appreciated that any number of standard pre-conditioning programs may be defined. For example, the pre-conditioning program may require that the cattle have received certain implant and antibiotic preferences. The pre-conditioning program may also specify the types of feed that the cattle is given (or not given). For example, the pre-conditioning program may specify that the cattle not be fed ruminant feed. The ability to specify the pre-conditioning program is significant because cattle raised under certain conditions typically perform better and remain healthier during the finishing phase of cattle production. In addition, cattle which have undergone certain pre-conditioning programs typically produce a higher quality carcass. Advantageously, by specifying the pre-conditioning program, the cattle buyers are able to exercise a higher degree of quality control over the cattle they purchase, thus enabling them to supply a more consistent, quality product to consumers.

The information regarding the animal type and pre-conditioning program enables the cattle buyer to track how certain pre-conditioning programs impact the cattle at later points in the production process. Thus, cattle buyers can use the present invention to gain information on which pre-conditioning programs are more likely to yield cattle with the desired characteristics at the time of slaughter. Advantageously, as described below, the cattle information server 16 automatically stores this data for each of the cattle producers in the system. As each producer sells more cattle through the system, the statistical data obtainable from the data stored in the cattle information system becomes more accurate, thus allowing cattle buyer's to better predict cattle performance and carcass characteristics for particular producers, particular geographic regions, etc.

In addition, the demand profile also preferably comprises delivery information regarding the cattle such as the preferred weight, price, sex, delivery dates, and number of head desired for each delivery period. It will be appreciated that this information may be updated regularly as market conditions change. In a preferred embodiment, the demand profile also comprises pricing information regarding the price the buyer is willing to pay for each sex, weight and delivery date. To facilitate obtaining this information, the cattle information server 16 may generate a fillable grid that includes text fields that the buyer may fill in using the buyer interface 10. It will be appreciated that the pricing information may constitute a "bid" price that the buyer is willing to pay for cattle satisfying their preferences. Advantageously, this allows cattle buyers to solicit cattle from cattle producers across the country while providing producers with the prices offered by a number of buyers for a series of delivery dates, thus eliminating many of the problems associated with private sales (wherein the number of buyers is typically limited) and auctions (wherein the seller is often at the mercy of a limited number of buyers bidding on his cattle). It will also be appreciated that cattle producers may use this information to plan their future cattle production such that their cattle are ready for sale at the times where the demand is highest. Similarly, cattle producers may use this information to adapt their pre-conditioning and cattle-breeding programs to match those programs with the highest demand or best offered bid.

Figure 3:
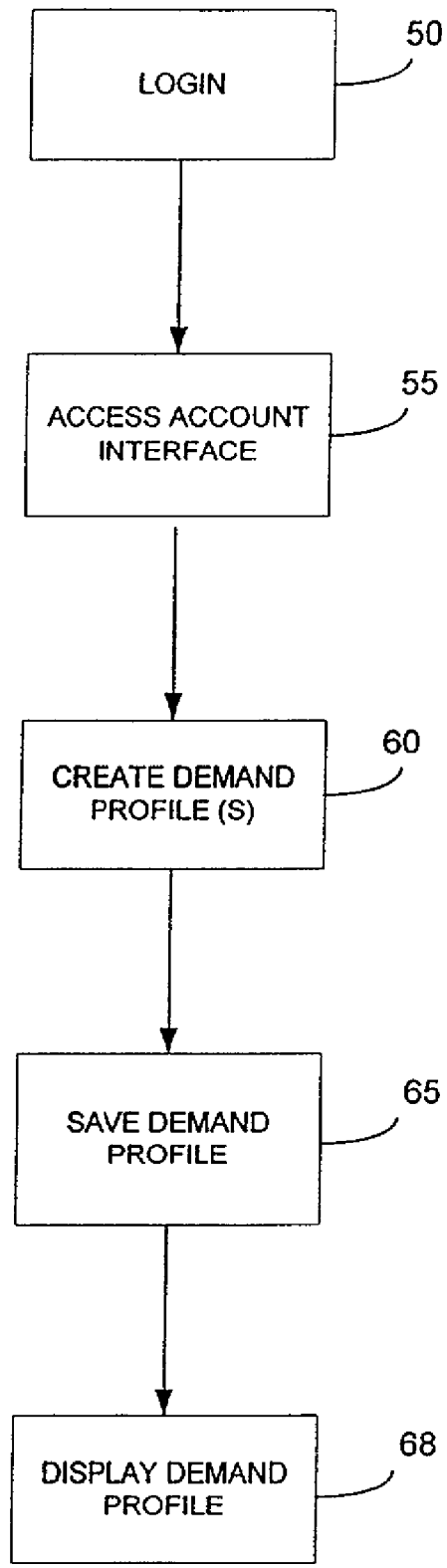
FIG. 3 is a flow-chart illustrating a possible procedure for creating a demand profile according to one aspect of the present invention.

After all of the information is entered through the buyer interface 10, the cattle information system creates a demand profile comprising the information and stores the demand profile in a secure database as shown in block 65 of FIG. 3. Preferably, the demand profile is stored in a searchable database that enables cattle producers to search the database for demand profiles matching the cattle they are marketing (as described below). In addition, the cattle producers are also preferably allowed to review the stored demand profiles to obtain information in planning their future breeding and pre-conditioning programs to better suit the expressed demand of the cattle buyers.

Cattle Producer Services and Quality Control

Like cattle buyer's, cattle producers may also access the beef cattle marketplace, preferably through the producer interface 14. The producer interface 14 may utilize any of several input/output devices to provide producers with access to the beef cattle marketplace services. In a preferred embodiment, the producer interface 14 may comprise a computer communicatively connected to the Internet. However, numerous other devices, such as phones, PDA's, facsimile machines, or local or wide area networks (LANs and WANs respectively), may also be used to provide access to the beef cattle marketplace server. The following discussion assumes that the producer accesses the beef cattle marketplace via an Internet-based interface. It will be appreciated, however, that similar access devices may be used without altering the novel aspects of the present invention.

In one embodiment of the present invention, the producer may be required to login to the producer interface 14 using a secure username and password. To facilitate this process, the producer may be presented with an interface that preferably displays an Internet web page comprising a login screen that is generated by the cattle information server 16 and transmitted to the producer interface 14. The producer may use this interface to input its login information and submit the login information to the cattle information server 16. The cattle information server 16 may first determine whether the producer has established a producer profile. If the cattle information server 16 determines that the login information corresponds to a producer profile stored on the cattle information server 16 (or on a database associated therewith), the cattle information 16 server provides access to a producer account interface that serves as a gateway to the beef cattle marketplace.

If the producer has not yet established a profile, the cattle information server 16 may present the producer with an interface through which the producer may input information sufficient to establish the producer profile. Preferably, the producer profile contains information concerning the producer, its preferences, and information regarding the producers cattle. The producer profile may contain, for example, the identity of the producer, the producer's demographic information, default information concerning the producer's cattle (pre-conditioning programs, certifications, etc.), and any other information that may facilitate quicker and/or more efficient interaction with the beef cattle marketplace. In a preferred embodiment, the producer enters this information through the producer interface 14 via an Internet web page containing a fillable template that is transmitted to the producer interface by the cattle information server 16. After the producer enters the requested information, the cattle information server 16 preferably assigns the producer unique and secure login information such as a login id and password. The particular type of login information used may vary according to the means by which the producer accesses the system. It will appreciated, however, that any one of numerous login and verification procedures well known in the art may be used without altering the novel aspects of the present invention. After a producer profile has been created and the producer has been assigned unique identification information, the producer may log into the beef cattle marketplace by inputting the producer's login information into the producer interface.

At this point, the producer is provided with an account interface (preferably an Internet web page) that preferably provides relevant industry information and access to the beef cattle marketplace. Preferably, the producer account interface provides information similar to that described above with reference to the buyer account interface. For example, the producer account interface may comprise past transaction history, pending supply profiles (as described below), or other information relevant to the producer industry such as industry news etc. In a preferred embodiment, the producer account interface may also comprise information concerning real-time (or regularly updated) commodity futures prices for both grain and livestock. The producer account interface may also include information regarding the producer's recent transactions. This information may be displayed in the manner described above with respect to the buyer account interface or in any other manner sufficient to communicate the information to the producer. Similarly, the producer account interface also preferably comprises information regarding recent transactions that have taken place in the beef cattle marketplace. Advantageously, this information enables the cattle producer to gain an understanding of the prevailing market conditions.

The producer account interface also preferably provides access to the services offered by the beef cattle marketplace. These services may include any service that enhances the development and marketing of cattle and makes it easier for the producers to develop, monitor and market their cattle. The following discussion will briefly describe several of the services that may be offered. It will be appreciated however, that the services described below are intended to be merely exemplary and are not intended to constitute all of the services that may be offered.

Producer Marketing Services

Figure 4:
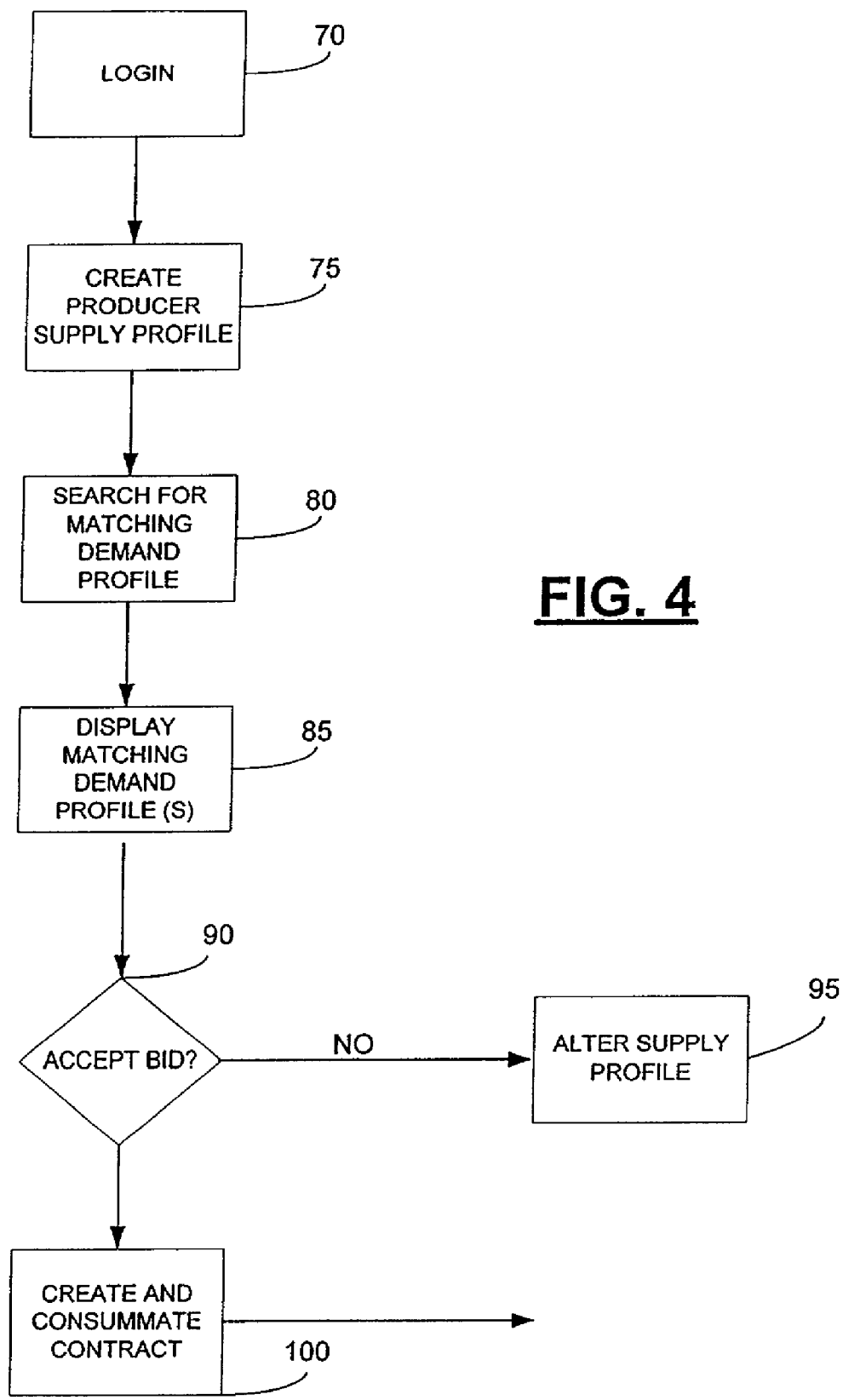
FIG. 4 is a flow-chart illustrating a possible procedure for creating a producer profile and matching the producer profile with a demand profile.

According to one aspect of the invention, the producers may use the beef cattle marketplace to market and sell their cattle to buyers across the country. FIG. 4 illustrates one possible procedure that may be used for this purpose. Initially, as shown in block 75, the producer preferably submits information to the cattle information server 16 sufficient to create a producer supply profile. The producer supply profile preferably comprises information regarding cattle that the producer wishes to market. In a preferred embodiment, the producer profile comprises: information regarding the number of cattle to be sold; the producer's willingness to sell, partner, or retain the cattle; the animal type(s) of the cattle being marketed; the expected delivery date and expected delivery weight of the cattle; the sex of the animals; information regarding the flesh condition of the cattle (i.e. whether the cattle are thin or fat); and information regarding the implant programs (i.e. growth promoting programs that utilize implants to improve growth rate and feed efficiency) and/or pre-conditioning programs followed in raising the cattle, if any. The supply profile may also contain a frame score for the cattle, which is a standardized measuring system that allows for uniform descriptions of the animal's physical characteristics. It will be understood that the supply profile may also contain any additional information that may be useful in marketing the cattle to be sold.

In one embodiment, the producer inputs all or part of the information described above using the producer interface 14. To facilitate collection of the information for the supply profile, the cattle information server 16 may present the producer with a fillable web page form in which the producer may input the information in response to a series of questions or profile fields. After the producer has inputted the requested information and transmitted it to the cattle information server 16, the cattle information server creates a new supply profile for the producer comprising the submitted information. The supply profile is preferably stored in a searchable database communicatively connected to the cattle information server 16. Advantageously, a summary of the supply profile may be stored in the producer's profile displayed as a pending transaction on the producer's account interface. In addition, the producer may be given the option of creating and storing multiple profiles for each type of cattle or delivery date.

In a preferred embodiment, the accuracy of the information submitted to the cattle information server 16 may be verified using a third party such as a veterinarian. This may be accomplished in numerous ways. In one embodiment, the veterinarian, and not the producer, is given access to the cattle information server using the producer interface 14. The procedures followed by the veterinarian are preferably the same procedures as those described above with respect to the producer. The veterinarian, however, may have access to multiple producer profiles corresponding to the producers that use the veterinarian to access the system. Thus, the cattle information server 16 may maintain a separate account interface for the veterinarian that contains information concerning all of the producer profiles to which it has access.

In this embodiment, the veterinarian collects the information necessary to create the producer supply profile from the producer and verifies that the information is correct. Advantageously, the veterinarian may have access to the health records of the cattle, the implant and pre-conditioning program followed, and other information that enables the veterinarian to verify that the information submitted to the cattle information server 16 is accurate. Furthermore, because veterinarians are often respected individuals in the community, their participation may encourage both producers and buyers to utilize the beef cattle marketplace and increase the reliability of the information stored in the beef cattle marketplace.

In another embodiment, the veterinarian may access the beef cattle marketplace through an interface that is independent from the producers, although the functionality is preferably the same. In this embodiment, the veterinarian may be asked to independently verify the information submitted directly to the beef cattle marketplace by the producers. Regardless of the method used, the veterinarian advantageously allows the information concerning the cattle to certified as accurate. Furthermore, the veterinarian may work with the producers to ensure their compliance with one or more certification or breeding programs. The veterinarian may also provide advice to producers regarding how to comply with certain certification or breeding programs or advice as to which types of pre-conditioning programs (or other cattle characteristics) are most in demand.

Returning now to FIG. 4, after the supply profile has been created, the producer (or veterinarian) may use the beef cattle marketplace to determine whether any of the bids submitted by the buyers (i.e. the demand profiles) match the supply profile submitted by the producer as shown in block 80. Program logic within the cattle information server 16 will compare the producer's supply profile with the buyer demand profiles currently stored in the server to determine whether any bids match the producer's supply profile. If a match is found, the cattle information server 16 may display one or more of the demand profiles matching the producer's supply profile, as illustrated by block 85 of FIG. 4. If multiple bids (demand profiles) matching the supply profile are found, the cattle information server 16 may provide a ranked listing of the matching bids. Using the producer account interface, the producer may be allowed to view the details of the buyer demand profiles matching the producer's supply profile. In a preferred embodiment, the listing of matching demand profiles will be displayed to the producer via an Internet web page. Advantageously, the cattle information server enables cattle producers to locate cattle buyers that are seeking cattle with specific characteristics. This is a significant advantage because cattle that have been raised according to a particular breeding program are often more valuable. Therefore, the cattle information server will likely enable a cattle producer obtain a better price for its cattle as well as enable a cattle buyer to locate cattle with specific characteristics (i.e. preconditioning programs etc).

The cattle information server 16 may also calculate the freight cost to ship the cattle from the producer to the buyer and display that information together with the details of the demand profiles. Alternatively, the cattle information server 16 may subtract the freight cost from each bid price prior to displaying the list of matching demand profiles (i.e. bids). The ranking order of the matching bids may be varied but is preferably ordered from the highest bid price to the lowest bid price. In the event that a buyer demand profile does not match the supply profile completely (i.e. one or more parameters are different), the demand profile may still be displayed with the parameter that does not match being identified and displayed prominently. Advantageously, this feature may offer the producer the opportunity to alter one or more of the characteristics of the cattle offered for sale in order to comply with the buyer's demand profile prior to the delivery date specified in the profile. This may also allow the producer to alter its production parameters to produce cattle matching the demand profiles with the highest bid price.

In a preferred embodiment, the cattle information server 16 also produces one or more graphical representation summarizing information relating to the buyer demand profiles and the producer supply profiles. For example, the cattle information server 16 may compile information pertaining to the average bid price for the type and quality of cattle submitted by the producer. This information may be displayed in tabular format (such as a chart) that shows the bid prices for a preset time period surrounding the shipment day included in the producer's supply profile. Similarly, total volume of the demand (head) for the type and quality of animals may be displayed in a similar fashion. Advantageously, this information may be used by the producer to determine if better financial opportunities are available for marketing its cattle earlier or later than the shipment date included in its supply profile. The chart is preferably displayed on the same display (such as an Internet web page) containing the ordered listing of matching demand profiles.

Referring still to FIG. 4, the producer may then determine whether to accept any of the displayed matching bids as shown in block 90. If none of the bids are acceptable, the producer may elect to alter its supply profile and repeat the matching process as shown in block 95. If the producer elects to accept one of the displayed bids, the beef cattle marketplace enables the producer to create and execute an agreement as illustrated by block 100.

At this point, the procedure under which the producer and buyer enter into an agreement may depend on the buyer's and producer's preferences, the role of the veterinarian, and/or the role of the beef cattle marketplace. A representative from the beef cattle marketplace may serve as an intermediary by contacting the buyer on behalf of the producer. The representative may also create a contract setting forth the details of the transaction and work with both the buyer and the producer to negotiate any terms not included in the supply and demand profiles. After the terms are agreed upon, the representative may work with a veterinarian to verify that the cattle meet the criteria specified in the contract. In addition, the representative may also coordinate the execution and storage of the contract by having the buyer, producer, and veterinarian sign the contract. The representative may then log the transaction as completed and update each parties' account interface to reflect that the transaction is complete.

Figure 5:
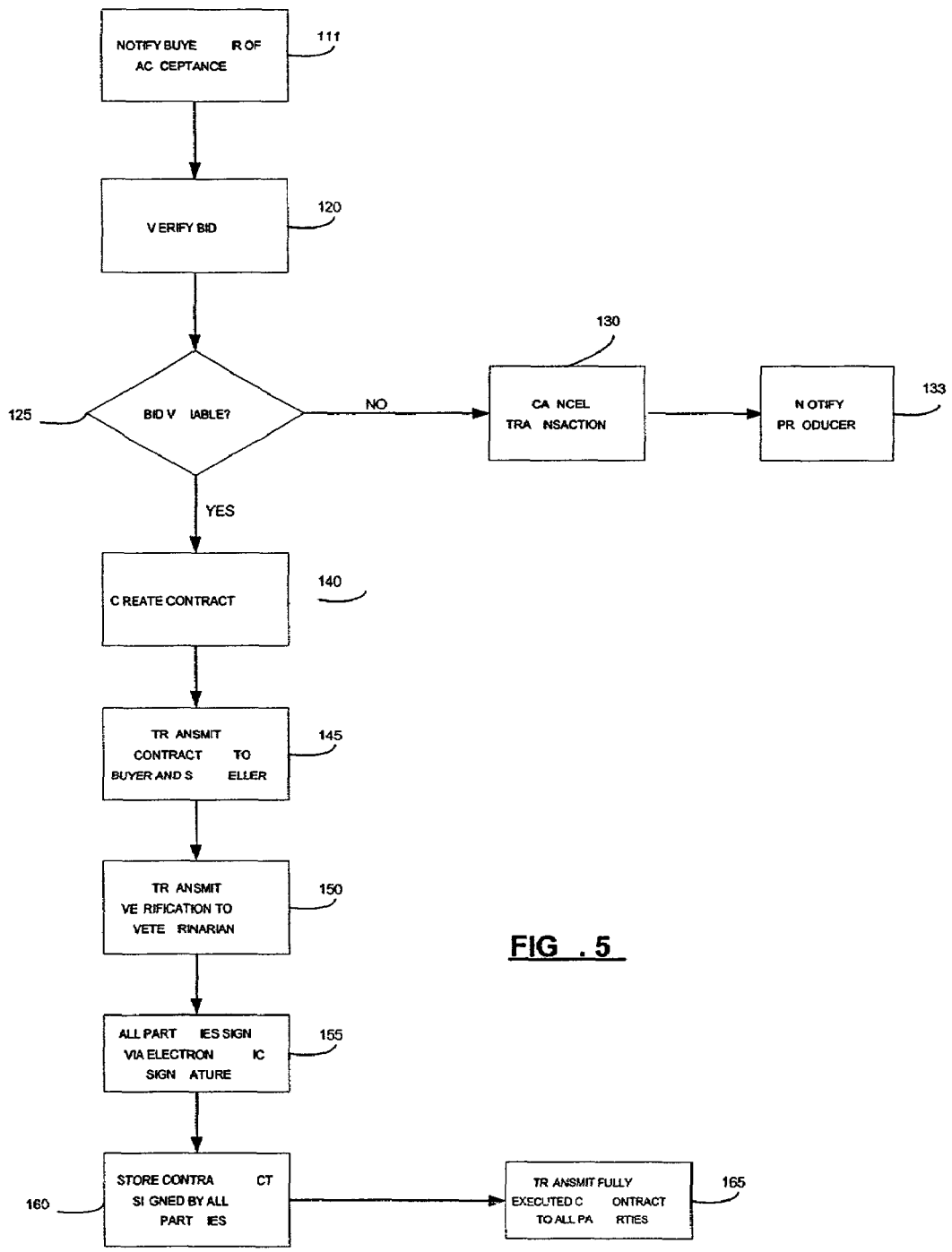
FIG. 5 is a flow-chart illustrating a possible procedure for consummating an online transaction between a buyer and a producer.

In a preferred embodiment, the role of the representative may be implemented automatically using the cattle information server 16 to coordinate the transaction. FIG. 5 illustrates one possible procedure that may be used to create and execute an agreement between the parties online using the cattle information server 16. As shown in block 115 of FIG. 5, after a producer decides to accept a bid, the cattle information server 16 may initially notify the buyer that its bid has been accepted. The buyer may then be asked to verify the accuracy of the bid to ensure that the terms are still valid and that no inadvertent terms were included. This may be accomplished via numerous well-known communication methods. According to a preferred embodiment, this is accomplished automatically by using the cattle information server 16 to create and transmit an electronic notification (such as an email) to the buyer indicating that its bid has been accepted and setting forth the terms of the accepted bid. The buyer may also be notified electronically by posting a message to the buyer's account interface. Alternatively, a representative of the beef cattle marketplace may contact the buyer directly via electronic means as described above or via telephone or any other communication device well known in the art.

As illustrated by block 125, the buyer may then verify the accuracy of the bid and determine whether the bid remains viable. If the bid is incorrect or if the buyer no longer wishes to honor the terms of the bid, the transaction may be cancelled as shown in block 130. In the event that the bid is no longer viable, the cattle information server 16 may notify the producer as shown in block 133 and the transaction may be cancelled. This may be accomplished using any of several communication means well known in the art. However, in a preferred embodiment, the buyer may transmit his rejection of the bid via electronic mail back to the cattle information server 16 or directly to the buyer. If the bid is not viable as a result of a clerical error, the buyer may be provided with a link to the demand profile enabling the buyer to correct the inaccurate term or terms. The corrected bid may then be transmitted back to the producer to determine whether the corrected terms remain acceptable.

If the bid remains viable, the cattle information server 16 may automatically generate a contract between the parties that sets forth the agreed upon terms and conditions as illustrated by block 140 of FIG. 5. After the contract has been created, a copy is automatically forwarded to both the buyer and the seller as shown in block 145. At the same time, a cattle verification form may also be forwarded to a veterinarian. The verification form may simply comprise the terms of the contract, the contract itself, or a simplified list of the characteristics of the cattle. Advantageously, the veterinarian may use this form to verify that the cattle information contained in the supply profile is accurate, thus ensuring that the cattle satisfy the specified criteria. The cattle information server may also provide a means for correcting any information that cannot be verified by the veterinarian. For example, if the veterinarian determines that that the supply profile contains one or more inaccuracies, it may return the verification form to the cattle information server and note the inaccurate portions of the supply profile. The cattle information server 16 may then automatically generate a notification to the producer and/or the buyer pointing out the inaccuracies. The parties may then reevaluate the viability of the supply profile and/or the demand profile. It will be appreciated that program logic within the cattle information server 16 may be provided to automatically walk both the buyer and producer through a series of available options in the event that the original transaction is no longer viable. For example, the buyer may be given the option of altering its bid price to account for the inaccuracies.

As shown in block 155, if the contract is agreeable to both parties, both parties may sign the agreement using an electronic signature. Each party may then transmit the signed agreement back to the cattle information server 16. The veterinarian may also sign the verification form via electronic signature and transmit the verification form back to the cattle information server 16. The contract, electronically signed by both parties and the veterinarian, may then stored on the cattle information server 16 and the transaction may be automatically archived in a searchable database. In addition, the cattle information server 16 may automatically transmit a fully executed contract to both parties and the veterinarian for their records.

After the signed contract has been stored, the account interface for the buyer, seller, and the veterinarian is preferably updated to reflect that each party has a pending transaction. The transaction remains pending until the cattle are delivered on the agreed-upon date at which time the transaction is logged as completed and is shown on the respective interfaces as part of the parties' transaction history.

Benchmarking Services

According to another aspect of the present invention, the cattle information server 16 may automatically collect and archive one or more aspects of the beef production and marketing system. Advantageously, the cattle information server 16 may collect the necessary data from the buyer demand profiles and producer supply profiles that are already stored in the system. In a preferred embodiment, the cattle information server 16 will collect and archive information for cattle in the system comprising genetic histories, sire and dam production and health data, calfhood production and health data, background and feed production and health data, and post harvest data including consumer preference data wherever feasible. As described above, veterinarians may be used to validate information concerning the cattle prior to their delivery to feedlots. In addition, the veterinarians may also be used to collect some or all of the above information and submit it to the cattle information server 16.

It will be appreciated that the archived information may be used to compare individual producers and/or animal records to historical averages. Advantageously, the cattle information server 16 may mine the archived information and provide graphical summaries comparing the production parameters of a feedlot (or producer) to historical averages from the same feedlot, averages from other feedlots, or regional averages. It will be understood by those of skill in the art that specific information may be harvested from the cattle information databases (archives) using any of several well-known data mining techniques. These techniques may be implemented using program logic that is executed to perform an algorithm designed to retrieve the particular information that is desired. It will also be appreciated that any number of algorithms may be defined to enable users to harvest any subset of the information stored in the cattle information server (or in some device associated therewith) as well as prepare reports, charts, graphs, etc. containing comparison data and or summaries of data over time.

The present invention also enables producers, buyers and veterinarians to collect, store and archive the health information for particular cattle from birth to harvest. The beef cattle marketplace facilitates the collection and archiving of this data automatically by mining information submitted in the demand and supply profiles and by receiving additional information directly from veterinarians and cattle buyers at the time of harvest. For example, information concerning the carcass characteristics of a particular group of cattle at the time of harvest may be input into the cattle information server and correlated with the supply profile of the cattle. Advantageously, this will enable producers and buyers alike to track the procedures followed for a single cow, the cattle in a particular feedlot, all of the cattle in a particular region, etc. This information may also enable producers, buyers, and veterinarians to identify particular trends that may result from specific implant programs, pre-conditioning programs, feedtypes, etc. This information may also be used to identify and locate cattle and/or beef products that may be contaminated. For example, if a particular hormone implant is identified as causing a health hazard, the beef cattle marketplace enables a user to locate all of the cattle that have been exposed to that implant, thus making it possible to quickly isolate and eliminate the health hazard. Advantageously, the cattle information server enables producers, buyers and veterinarians to track cattle from birth to harvest, thereby allowing them to identify trends regarding how pre-conditioning programs affect particular cattle at the time of harvest.

As discussed above, the beef cattle marketplace also enables a user to certify that particular cattle have been raised according to one or more certification programs. For example, certain markets are restricted to cattle that are produced according to specified criteria. In the European Union, cattle must satisfy the Non-Hormone Treated Cattle Certification Program in order to be sold. Other markets may require ISO 9001 certification. Advantageously, the beef cattle marketplace of the present invention may be configured to automatically track the criteria necessary to satisfy such standards and may use veterinarians to certify that the standard has been met. Because the cattle production process may be archived from birth to harvest, information concerning any aspect of the cattle production process may be quickly and easily extracted from the system.

Many modifications and other embodiments of the invention will come to mind to one skilled in the art to which this invention pertains having the benefit of the teachings presented in the foregoing descriptions and the associated drawings. Therefor, it is to be understood that the invention is not limited to the specific embodiments disclosed and that modifications and other embodiments are intended to be included within the scope of the appended claims. Although specific terms are employed herein, they are used in a generic and descriptive sense only and not for purpose of limitation.

That which is claimed:

1. In a beef cattle marketplace comprising a buyer interface, a producer interface, and a cattle information server, each of which is communicatively connected to a network, a method for marketing cattle comprising:
   receiving information defining a plurality of demand profiles at the cattle information server from the buyer interface, wherein at least one of the demand profiles specifies a first pre-conditioning program for a group of cattle, a pre-conditioning program comprising criteria that govern the breeding, feeding, management, and health of cattle prior to slaughter;
   receiving information defining a supply profile for a group of cattle at the cattle information server from the producer interface, wherein the supply profile specifies a second pre-conditioning program for the group of cattle;
   verifying the supply profile by a veterinarian;
   comparing the supply profile to the plurality of demand profiles to determine whether a match exists between the supply profile and one of the demand profiles, based at least in part on a comparison of the first and second pre-conditioning programs; and
   providing an indication to one of the buyer interface and the producer interface of at least one matching demand profile in response to a match.

2. The method of claim 1, further comprising generating a bid associated with at least one of the plurality of demand profiles.

3. The method of claim 2, further comprising receiving an acceptance of a bid from the producer interface.

4. A system for dynamically marketing cattle comprising:
   a buyer interface;
   a producer interface;
   a network; and
   a cattle information server wherein the cattle information sewer is communicatively connected to the buyer interface and the producer interface through the network;
   wherein the cattle information server: receives information from the buyer interface defining a plurality of demand profiles, wherein at least one of the demand profiles contains information specifying a first pre-conditioning program, the first pre-conditioning program comprising any of numerous protocols or criteria that govern the breeding, feeding, management, and health of cattle prior to slaughter; receives information from the producer interface defining a supply profile, wherein the supply profile specifies a second pre-conditioning program, the second pre-conditioning program comprising criteria that govern the breeding, feeding, management, and health of cattle prior to slaughter; stores the demand profiles and supply profile in a database; and searches the database to determine if one or more of the demand profiles match the supply profile based at least in part on a comparison of the first and second pre-conditioning programs; and identifies to one of the buyer interface and producer interface at least one demand profile in response to a match between the supply profile and the demand profile, and wherein the producer interface is programmed with additional instructions to verify the supply profile by a veterinarian.

5. The system of claim 4, wherein the cattle information sewer further generates a bid associated with at least one of the plurality of demand profiles.

6. The system of claim 5, wherein the bid generated by the cattle information sewer includes a bid price based at least in part on a non-fixed public index price.

7. The system of claim 5, wherein the cattle information server is programmed to accept a bid using the producer interface.

8. In a beef cattle marketplace comprising a cattle information server and at least one interface, each of which is communicatively connected to a network, a method for tracking cattle production comprising:
   receiving information defining a supply profile at the cattle information server from the interface, wherein the supply profile specifies a pre-conditioning program of an identified group of cattle, the pre-conditioning program comprising criteria that govern the breeding, feeding, management, and health of cattle prior to slaughter;
   verifying, by a veterinarian, the pre-conditioning program of the identified group of cattle;
   storing the supply profile of the identified group of cattle in a database associated with the cattle information server;
   receiving information defining carcass characteristics of the identified group of cattle at the time of harvest from the interface;
   storing the carcass characteristics of the identified group of cattle in a database associated with the cattle information server; and
   correlating the carcass characteristics of the identified group of cattle with the supply profile.

9. The method of claim 8, further comprising identifying one of a geographic location and ownership identification of at least one animal selected from the identified group of animals.

10. The method of claim 8, further comprising storing a plurality of supply profiles and correlated carcass characteristics in a database and mining the database to determine patterns between the pre-conditioning program and at least one carcass characteristic.

* * * * *

UNITED STATES PATENT AND TRADEMARK OFFICE
CERTIFICATE OF CORRECTION

| | | |
|---|---|---|
| PATENT NO. | : 7,584,136 B2 | Page 1 of 1 |
| APPLICATION NO. | : 09/909587 | |
| DATED | : September 1, 2009 | |
| INVENTOR(S) | : Shuler et al. | |

It is certified that error appears in the above-identified patent and that said Letters Patent is hereby corrected as shown below:

Title page, item [30]

Insert the following,

--Provisional Priority    60/219,544    July 20, 2000--.

Column 15,

Line 36, "sewer" should read --server--.

Column 16,

Lines 11 and 14, "sewer" should read --server--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,584,136 B2
APPLICATION NO. : 09/909587
DATED : September 1, 2009
INVENTOR(S) : Shuler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2910 days.

Signed and Sealed this

Fourteenth Day of September, 2010

David J. Kappos
*Director of the United States Patent and Trademark Office*